United States Patent [19]

Cogan

[11] Patent Number: 5,530,581
[45] Date of Patent: Jun. 25, 1996

[54] PROTECTIVE OVERLAYER MATERIAL AND ELECTRO-OPTICAL COATING USING SAME

[75] Inventor: Stuart F. Cogan, Sudbury, Mass.

[73] Assignee: EIC Laboratories, Inc., Norwood, Mass.

[21] Appl. No.: 456,268

[22] Filed: May 31, 1995

[51] Int. Cl.⁶ .................. G02F 1/15; G02F 1/03
[52] U.S. Cl. ........................... 359/265; 359/245
[58] Field of Search ...................... 359/265, 274, 359/275, 359, 245, 273

[56] References Cited

U.S. PATENT DOCUMENTS

| | | | |
|---|---|---|---|
| 4,350,414 | 2/1982 | Takahashi et al. | 350/357 |
| 4,647,472 | 6/1987 | Hiraki et al. | 427/39 |
| 4,853,251 | 8/1989 | Ishihara et al. | 427/38 |
| 5,080,471 | 1/1992 | Cogan et al. | 350/357 |
| 5,133,594 | 7/1992 | Haas et al. | 350/357 |
| 5,136,419 | 8/1992 | Shabrang | 350/357 |
| 5,216,536 | 5/1993 | Agrawal et al. | 359/274 |
| 5,238,866 | 7/1993 | Bolz et al. | 437/100 |

OTHER PUBLICATIONS

Chang et al., "Novel Passivation Dielectrics—The boron— or Phosphorous—Doped Hydrogenated Amorphous Silicon Carbide Films," J. Electrochem. Soc., 132, 418–422 (1985).

*Primary Examiner*—Georgia Y. Epps
*Assistant Examiner*—Dawn-Marie Bey

[57] ABSTRACT

An electro-optical device comprising a series of thin films with an electrically controllable optical state provided with a protective overlayer that has a high optical transmittance and high resistance to penetration by $H_2O$. The protective overlayer is a film of amorphous silicon oxycarbide (a-SiOC:H) having an O to C ratio such that the optical absorption edge of the a-SiOC:H is 3 eV or greater and the $H_2O$ transport through a 500 nm thick film of a-SiOC:H is $10^{12}$ molecules/cm²-s or less.

8 Claims, 11 Drawing Sheets

PROTECTIVE OVERLAYER MATERIAL AND ELECTRO-OPTICAL COATING USING SAME

This invention was made with Government support under Contract No. N00019-94-C-0280, awarded by the U.S. Department of Defense. The Government has certain rights to this invention.

FIELD OF THE INVENTION

This invention relates to electro-optical coatings for modulation of electromagnetic radiation and more particularly to thin-film materials and coatings used as protective overlayers for electrochromic devices having an all-thin-film structure.

BACKGROUND OF THE INVENTION

An electrochromic material changes its optical properties in response to an electrically driven change in its state of oxidation or reduction. In order to make use of the optical modulation in practical applications, the electrochromic material can be incorporated into a multilayer coating. The multilayer structure provides a means of supplying electronic current over the optical switching area of the coating and a counter electrode layer which undergoes reversible reduction and oxidation reactions. The counter electrode provides a means for charge-balancing the reduction-oxidation reactions in the electrochromic film and is necessary to achieve a large number of reversible optical switching cycles. An ion conducting layer with a high electronic resistivity separates the electrochromic film from the counter electrode layer. During the optical switching process, counter ions are transported between the electrochromic and counter electrode layers to preserve charge neutrality within the electrochromic coating. The counter ions are usually $H^+$ or $Li^+$. Structures of electrochromic devices incorporating these basic elements have been described in prior art patent and scientific literature. Examples include: thin film coatings using $H^+$ ion transport between $WO_3$ and $IrO_2$ (Takahashi et al., U.S. Pat. No. 4,355,414, September 1992); and, thin film coatings using $Li^+$ ion transport between $WO_3$ and $Li_yCrO_{2+x}$ (Cogan and Rauh, U.S. Pat. No. 5,080,471, June 1992).

In many applications, electrochromic coatings will encounter elevated temperatures, high levels of solar irradiance, and a wide range of humidities. Chemical, photothermal, and photochemical degradation may accompany these environmental stresses. Of particular importance in determining the severity of degradation is the role played by water ($H_2O$) in the layers in the electrochromic coating. Both hydration and dehydration of the electrochromic coatings during service may result in degradation and decline in useful switching performance. For example, in electrochromic coatings using $Li^+$ ions, the layers are often hygroscopic and absorb $H_2O$ from the ambient air. The absorbed $H_2O$ reacts with the lithiated electrochromic layers causing a decrease in optical switching range and, in coatings for visible transmittance or reflectance modulation, also the appearance of haze. In electrochromic coatings employing the $H^+$ ion, loss of $H_2O$ by dehydration in dry atmospheres may result in a severe reduction in optical switching speed. The reduction in speed is due to a decrease in $H^+$ ion conductivity of the electrochromic and ion conducting layers which must be partially hydrated to achieve the desired level of ionic conductivity.

If a thin film electrochromic coating is to have a useful lifetime in any practical application, a means of preventing exchange of $H_2O$ between the electrochromic coating and the ambient environment is necessary. Although there is an extensive body of literature on thin-film coatings for protecting integrated circuits and optical elements such as filters and lenses, there is very little prior art concerning the protection of electrochromic coatings exposed to the environment. Effectiveness as a barrier to $H_2O$ transport is a key property of a protective overlayer for electrochromic coatings. However, prior art coatings used to protect integrated circuits and optics have not demonstrated appropriate optical properties in combination with the required hermeticity to $H_2O$ transport.

Optically, the protective overlayer must have a high transmittance in the wavelength range for which the electrochromic coating is being used to modulate radiation. For coatings used in visible modulation, a high transmittance in the 400–700 nm wavelength range is required while coatings for solar modulation must be transparent from 350–2500 nm. Transparency at wavelengths shorter than 350 nm is usually not required since it is often desirable to prevent transmission of the solar ultraviolet. Other desirable properties of the overlayer include a high electronic resistivity to prevent the overlayer acting as an electronic short between the transparent conductors or the electrochromic layer and counter electrode; a high hardness to provide protection against abrasion; and low intrinsic film stress to prevent delamination of the coating.

A variety of materials have been investigated as thin-film hermetic coatings. In integrated circuit (IC) fabrication, dielectric passivation, such as silicon dioxide or silicon nitride, deposited by low pressure chemical vapor deposition (LPCVD) or plasma enhanced chemical vapor deposition (PECVD), is typically used as a barrier layer to $H_2O$ and ion migration. For most IC devices, an additional encapsulant such as an epoxy is used in conjunction with the dielectrics. As will be shown by example, conventional semiconductor passivation has either inadequate $H_2O$ barrier properties or inappropriate optical properties for overlayers on electrochromic coatings. IC passivation is also deposited at elevated temperatures, >350° C., which cannot be tolerated by most electrochromic coatings, particularly those relying on $H_2O$ Of hydration to maintain a high $H^+$ ion conductivity. Other materials such as amorphous silicon carbide (Hiraki, et al U.S. Pat. No. 4,647,472, March 1987) have been described for semiconductor passivation. Amorphous silicon carbide has excellent properties as a $H_2O$ barrier but, as will be shown by example, has poor transmittance in the visible region of the spectrum.

Prior art methods of protecting electrochromic devices using $H^+$ ions have been described by Agrawal et al (U.S. Pat. No. 5,216,536, Jun. 1, 1993) and Shabrang (U.S. Pat. No. 5,136,419, Aug. 4, 1992). Agrawal et al reveal a moisture control layer comprised of a water reservoir material in conjunction with a moisture permeable barrier layer that prevents dehydration of the electrochromic coating. This approach to preventing dehydration has the disadvantage of limited optical transmittance due to the reservoir and barrier materials. The improvement described by Shabrang is to operate an electrochromic coating in an atmosphere containing an inert gas and vapor of high dielectric constant material (for example, water vapor) enclosed in a double-pane window in which the electrochromic coating is on an interior surface. This approach is deficient in that it is limited to a double-pane configuration and that, at low temperatures, the vapor will condense on the interior surface thereby compromising optical clarity and promoting chemical degradation.

The invention described, herein, is intended to overcome the deficiencies of prior art approaches to protecting electrochromic devices and to provide a means of protecting both $H^+$ and $Li^+$ counter ion electrochromic coatings against $H_2O$ egress and ingress for periods of time appropriate for commercial applications that include, but are not limited to, electrochromic displays, sunglasses, automobile sunroofs, and large-area architectural glass for building windows.

SUMMARY OF THE INVENTION

The present invention provides an electro-optical coating with a protective overlayer that is substantially impervious to the transport of $H_2O$, the protective overlayer having a high transmittance in the visible and solar regions of the electromagnetic spectrum. The protective overlayer comprises one or more layers of thin-film materials, one of which is amorphous hydrogenated silicon oxycarbide (a-SiOC:H).

DESCRIPTION OF THE PREFERRED EMBODIMENTS

Figure 1:
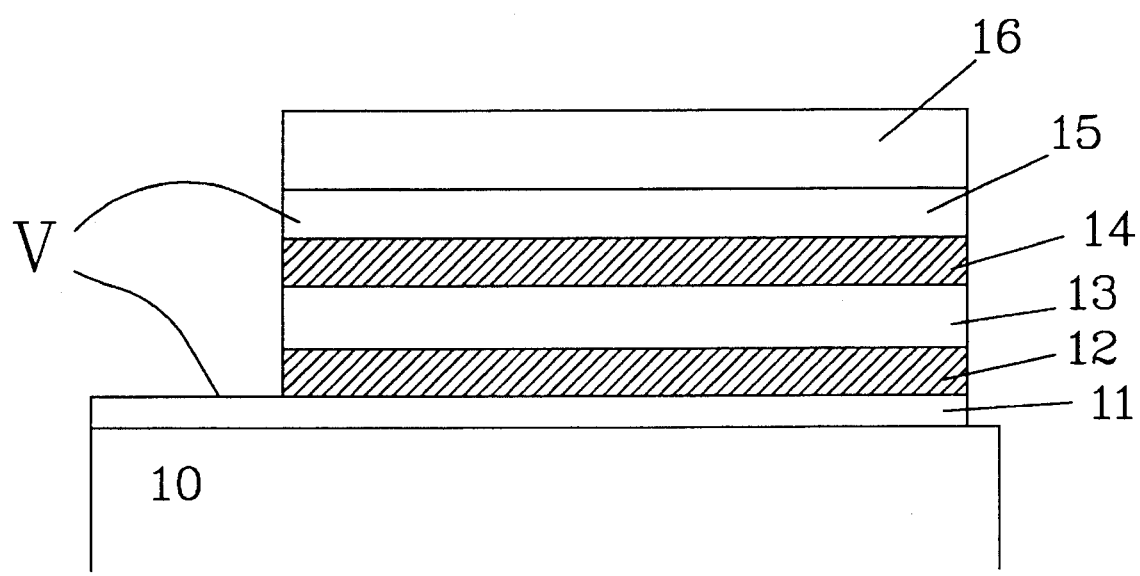
FIG. 1 is a cross-sectional view of an electrochromic device in a preferred embodiment of the present invention in which a protective overlayer of a-SiOC:H is used to prevent moisture ingress or egress.

Referring to FIG. 1, a cross-sectional view of an electrochromic device is shown in a preferred embodiment of the present invention. The device contains six layers disposed sequentially over a substrate (10) which, for applications involving modulation of visible and solar radiation, is usually glass or plastic. Layers 11 and 15 are thin-film, transparent electronic contacts. Preferred materials for the transparent contacts (11 and 15) include tin-doped indium oxide (ITO) or fluorine-doped tin oxide (SFO) with a sheet resistivity of <30Ω/sq. Layer 14 is an electrochromic material such as amorphous or crystalline $WO_3$ or $MoO_3$ with a preferred thickness of less than 500 nm. Layer 12 is an anodically coloring counter electrode such as $IrO_2$ or NiO for $H^+$ systems or $Li_yCrO_{2+x}$, $V_2O_5$, $Nb_2O_5$, $TiO_2$, and mixed-oxides of V and Cr for $Li^+$ systems. Separating the electrochromic layer (14) and counter electrode layer (12) is an ion-conducting layer (13) that has a high electronic resistivity. The ion-conducting layer (13) may transport $H^+$ or $Li^+$ ions, depending on the choice of electrochromic material and counter electrode. For example, choosing $WO_3$ and $Li_yCrO_{2+x}$ as electrochromic layer and counter electrode, respectively, necessitates the use of a $Li^+$ conducting layer while choosing $WO_3$ and $IrO_2$ requires a $H^+$ conducting layer. Preferred materials for the ion conducting layer are hydrated $Ta_2O_5$ for $H^+$ systems and $Li_2O$-$B_2O_3$ for $Li^+$ systems. Layer 16 of FIG. 1 is the protective overlayer of the present invention which contains one or more films, at least one of which is a-SiOC:H. The a-SiOC:H is preferably 1 µm thick or less.

A preferred method of forming the amorphous silicon oxycarbide films is PECVD from silane ($SiH_4$) and methane ($CH_4$) gas mixtures to which an oxidizer such as oxygen ($O_2$) or nitrous oxide ($N_2O$) is added. The general PECVD process is well known to artisans of vacuum coating technology and is only briefly described herein. The PECVD apparatus comprises a vacuum pumped chamber containing two planar electrodes which are typically 1–3 cm apart. The electro-optical coating is placed on one of the electrodes which is usually heated with a resistive element embedded in the electrode. The other electrode is connected to a high frequency power supply that will typically operate at a frequency between 50 kHz and 13.56 MHz. The reactive gas mixture is introduced into the chamber at a well-controlled flow rate and the gas pressure controlled by modulating the flow rate or by the use of a variable-sized orifice between the chamber and vacuum pumps. When the power supply is energized, a plasma of the reactive gas constituents forms between the electrodes causing an a-SiOC:H film to deposit on the surface of the electro-optical coating. Typical PECVD conditions used to produce a-SiOC:H overlayers on electrochromic coatings are listed in Table 1. Another preferred method of depositing a-SiOC:H films is sputtering from a Si target using a reactive gas mixture that includes methane and either oxygen or nitrous oxide.

A significant improvement in the density and hardness of the a-SiOC:H films deposited using the PECVD process revealed in Table 1 is obtained if the surface being coated is electrically isolated from the heated electrode on which the substrates are placed. Electrical isolation modifies the electrical potential the substrates attain during coating, which results in an increase in ion bombardment during a-SiOC:H deposition. The increased ion bombardment results in densification and improved hardness of the films. For most electro-optical coatings of the present invention, which typically use glass substrates, the electronic isolation occurs without modification to the apparatus since the glass is itself electronically insulating. If, however, the design of the electro-optical device is such that its upper surface is in electrical contact with the heated electrode, improved a-SiOC:H film properties are obtained if a thin insulating plate is placed between the device and the electrode. Glass or alumina are suitable materials for the insulating plate.

In prior art, the use of amorphous silicon carbide (a-SiC:H) as a protective overlayer for integrated circuit elements has been taught by Hirahi et al (U.S. Pat. No. 4.647.472, March 1987) and Bolz et al (U.S. Pat. No. 5,238,866, August 1993). Both teach the use of the PECVD process using silane and methane as reactive gases. Bolz et al further teach the addition of phosphine ($PH_3$) to the reactive gas mixture to increase the electronic conductivity of the a-SiC:H for improved compatibility with blood. Hiraki et al also teach the addition of impurities of hydrogen, nitrogen, oxygen and a halogen (e.g. Cl of F) for the purpose of maintaining low base-collector leakage currents in semiconductor devices. The impurity content of the a-SiC:H being preferably less than 10% of the stoichiometric composition of the compound formed between the impurity element and silicon.

Figure 2:
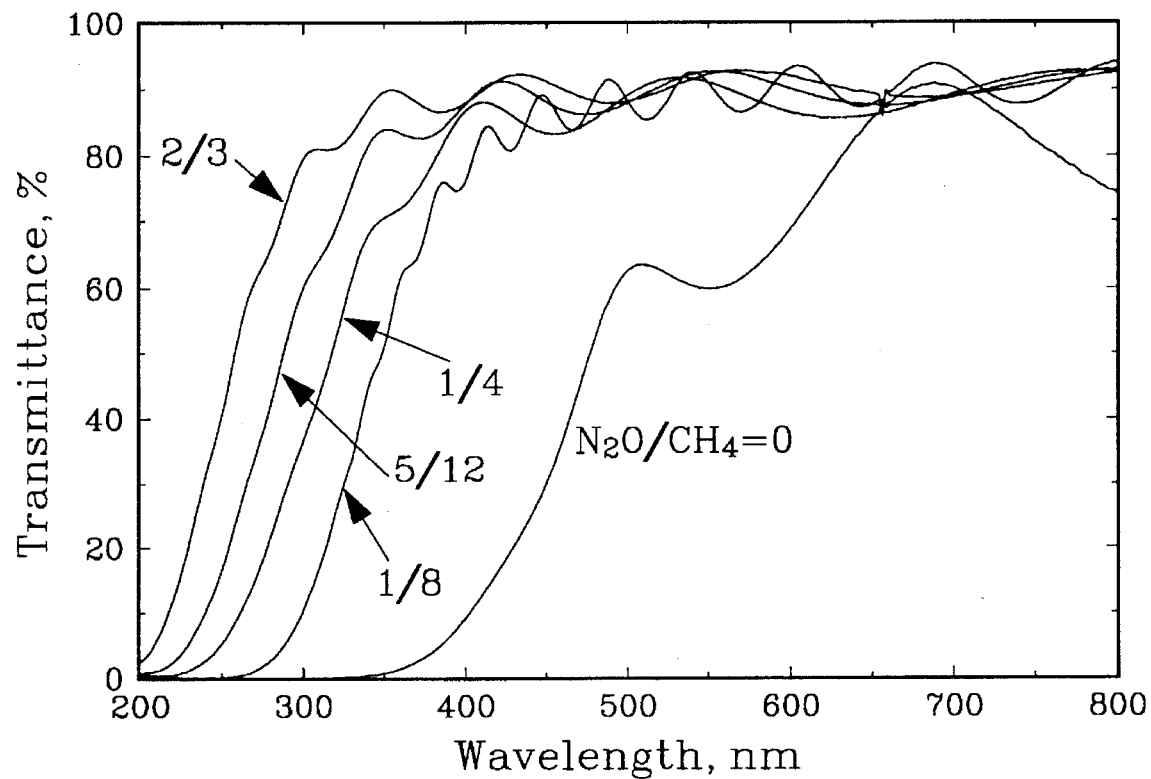
FIG. 2 shows a comparison of the spectral transmittance of a-SiC:H ($N_2O/CH_4=0$) and of a-SiOC:H films formed by the PECVD process using different $N_2O/CH_4$ reactive gas ratios.

Prior art a-SiC:H and doped a-SiC:H films are not appropriate as protective overlayers for electrochromic coatings because they are poorly transmissive in the visible spectrum and exhibit a yellow color. This deficiency in transmittance of a-SiC:H is illustrated by the transmittance spectra shown in FIG. 2 which compares the transmittance of a-SiC:H with a-SiOC:H films prepared with different $N_2O/CH_4$ ratios in the plasma during PECVD. The spectra shown in FIG. 2 are for films deposited on quartz substrates. The a-SiC:H spectrum, labeled $N_2O/CH_4=0$ in FIG. 2, shows that a-SiC:H films are absorbing in the blue region of the spectrum, from 380 nm to 500 nm, and are thus yellow. The transmittance of the a-SiC:H film, weighted to the photopic response of the human eye using the 1931 CIE response curves as described in the Handbook of Optics (W. G. Driscoll. editor, McGraw-Hill 1978), was 63%. In comparison, a-SiOC:H films deposited with $N_2O/CH_4$ ratios of ⅛ or greater have photopic transmittance values exceeding 89%. In addition to having poor visible transmittance, films of a-SiC:H exhibit an electronic resistivity of $10^{13}$–$10^{14}$ $\Omega$-cm. Although this resistivity is high, it may still lead to undesirable electronic contact between layers in the electrochromic coating if the a-SiC:H is used as a protective overlayer. The electronic contact is likely to occur at the edges of the coating where the different layers are exposed. The contact causes internal shorting with a consequent reduction in the time the coating will retain a set optical state without power consumption. The a-SiOC:H of the present invention has an electronic resistivity of $>10^{16}\Omega$-cm which is at least two orders of magnitude higher than a-SiC:H.

The improved transmittance of the a-SiOC:H films is due to a shift in the optical absorption edge to shorter wavelengths as the oxygen concentration in the films increases. The oxygen concentration is controlled by the $O_2/CH_4$ or $N_2O/CH_4$ gas flow ratios used during deposition, higher ratios producing films with a higher oxygen content. The optical absorption edge is the minimum energy of light necessary to promote a charge carrier from the valence to conduction band of the material. The energy of light and the corresponding wavelength are related by $E=hc/\lambda$ where E is the energy of the light, c the speed of light, $\lambda$ the wavelength, and h Planck's constant. In general, light with a wavelength larger than the absorption edge (lower energy) is transmitted by the material while light of shorter wavelength (higher energy) is absorbed. This concept is familiar to skilled artisans and methods in which the absorption edge is calculated from spectral data are well known. Values for the absorption edge were calculated for the a-SiC:H and a-SiOC:H spectra shown in FIG. 2 by modeling the absorption using the relationship $$\alpha(h\nu)=A(h\nu-E_o)^2$$

where $\alpha$ is the absorption coefficient, A a constant, and $E_o$ the absorption edge. The optical absorption edge for the a-SiC:H film was 2.12 eV (wavelength 585 nm) which is in the blue region of the visible spectrum. The wavelength ($\lambda_o$) corresponding to the absorption edge is calculated from $E_o$ by the equation $\lambda_o=1241/E_o$, where $E_o$ is in units of eV and $\lambda_o$ in nm. As the $N_2O/CH_4$ ratio increases, the absorption edge moves to higher energies and the a-SiOC:H films become increasingly transmissive in the blue and near-ultraviolet regions of the spectrum. For the a-SiOC:H film deposited with a $N_2O/CH_4$ ratio of ⅛, the absorption edge has moved to 3 eV (415 nm) and the photopic transmittance has increased to 89%. The effect of increasing the $N_2O/CH_4$ ratio on the optical properties of the a-SiOC:H films are detailed in Table 2.

At higher $O_2/CH_4$ or $N_2O/CH_4$ reactive gas ratios, the carbon content of the a-SiOC:H is reduced and a film with properties similar to $SiO_2$ is produced. Although $SiO_2$ films are highly transparent over the entire solar spectrum, they have poor hermetic properties as shown by the leakage current measurements described in Example 1. At a bias of $-5$ V, the leakage currents are on the order of $10^{-5}$ A which is comparable with the ITO transparent conductor and orders of magnitude higher than a-SiOC:H.

Thus, it is seen that a-SiC:H and a-$SiO_2$ are deficient as protective overlayers for electrochromic coatings because of poor transmittance and poor hermeticity, respectively. Careful choice of the $O_2/CH_4$ or $N_2O/CH_4$ ratio during deposition, however, produces films of a-SiOC:H that have the hermetic properties of a-SiC:H and the solar transmittance characteristics of a-$SiO_2$. In addition to their desirable optical and hermetic properties, the a-SiOC:H films are deposited at low substrate temperatures and still retain these characteristics. The a-SiOC:H films used in the examples cited herein were deposited at a substrate temperature of 100° C., which is low compared with the 350° C. or higher temperatures used for $SiO_2$ and other conventional PECVD dielectric passivation materials. The feature of low substrate temperature deposition greatly increases the utility of a-SiOC:H as a protective overlayer for electrochromic coatings since many of the properties of materials used in both $H^+$ and $Li^+$ counter ion systems are degraded at elevated temperatures. Films of a-SiOC:H deposited at temperatures below 100° C. can also be used as protective overlayers for electrochromic coatings although the degree of hermetic protection will be reduced.

Figure 3:
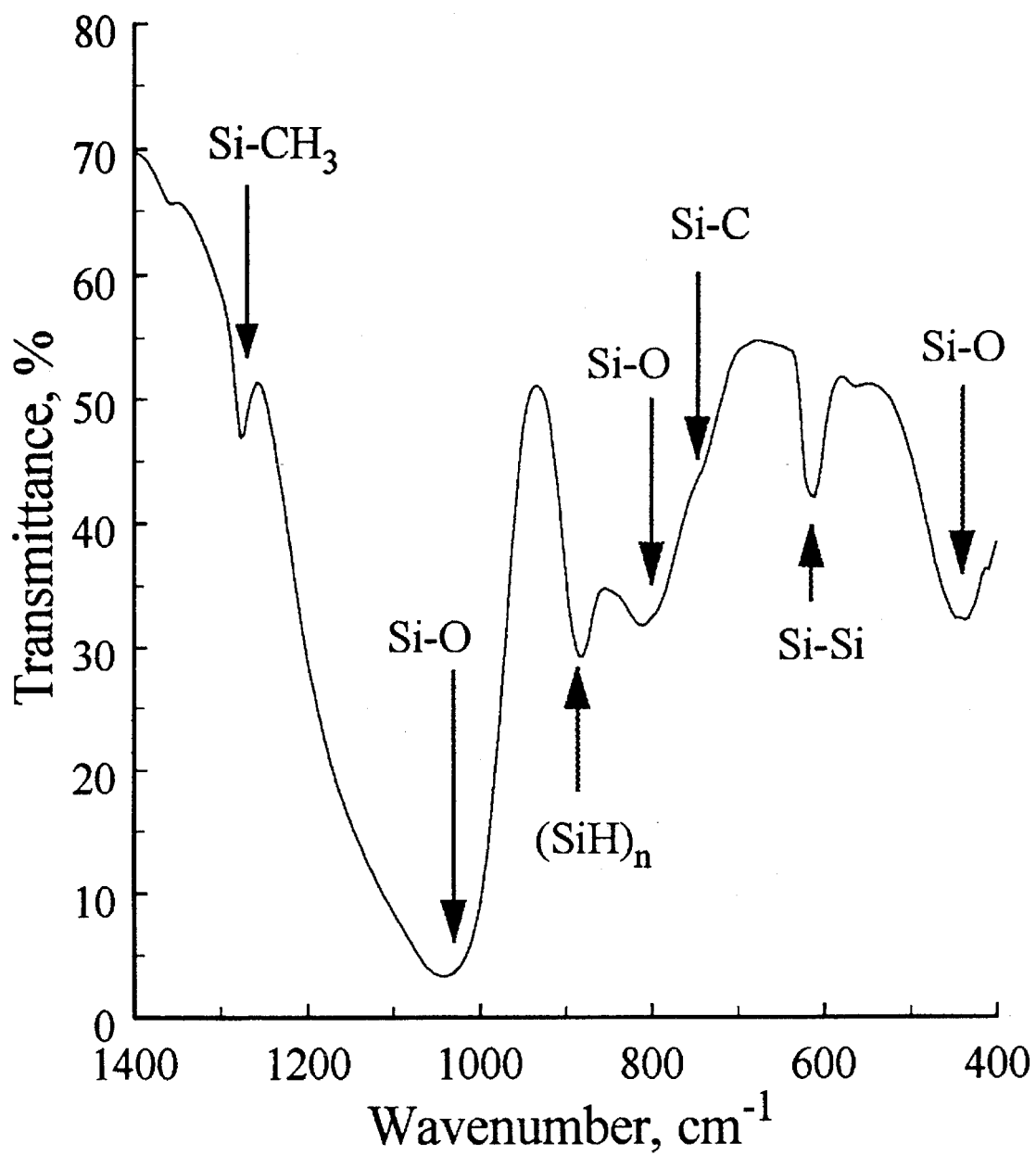
FIG. 3 shows an infrared transmittance spectrum of a-SiOC:H in one embodiment of the present invention.

The effect of the low temperature deposition process on the molecular structure of the a-SiOC:H films is revealed qualitatively by infrared spectral measurements. The infrared spectra contain absorption peaks corresponding to various vibrational modes of different interatomic bonds in the films. An infrared transmittance spectrum of PECVD a-SiOC:H, deposited at 100° C., is shown in FIG. 3. Absorption due to the stretching, bending and rocking modes of the Si-O bond is present at wavenumbers of 1030, 800, and 460 $cm^{-1}$, respectively. An absorption band for Si—C is present at ~740 $cm^{-1}$, as a shoulder on the Si-O bending band. In addition, there is a band at 890 $cm^{-1}$, indicative of short chain polysilane segments of formula $(SiH_2)_n$. The polysilane segments result from incomplete reaction of $SiH_4$ at the 100° C. substrate temperature used in the film deposition. The presence of the 890 $cm^{-1}$ band indicates that the low temperature films have a molecular structure that is somewhat polymeric in nature. As the substrate temperature or RF power density during deposition increase, the $(SiH_2)_n$ band intensity decreases and the a-SiOC:H becomes less polymeric. The a-SiOC:H material of the present invention, therefore, retains the hermeticity and optical transmittance necessary for protective overlayer applications while exhibiting a range of molecular structure.

Following the convention used in prior art (Bolz, U.S. Pat. No. 5,238,866), the chemical formula for the amorphous silicon oxycarbide of the present invention is written as a-SiOC:H (a=amorphous). A chemical composition for the a-SiOC:H films has not been specified since the PECVD and sputtering processes can produce films that have a wide compositional range and still embody the essential features of the present invention. For example, when $N_2O$ is used as a source of oxygen or when $N_2$ is used as a diluent gas for $SiH_4$, some nitrogen is incorporated into the a-SiOC:H. Since the chemical reactions in the PECVD process are incomplete at low deposition temperatures, some H is also incorporated in the films if $SiH_4$ is used as a precursor material. Furthermore, precise compositional analysis of thin films containing light elements such as H, C, N, Si, and O is difficult, and different analysis techniques are often not in agreement. The formula a-SiOC:H is not meant to indicate a specific oxygen/carbon ratio, nor H or N content in the film. The a-SiOC:H films of the present invention are differentiated from prior art a-SiC:H or doped a-SiC:H films by 1) the optical absorption edge of the a-SiOC:H films which should be 3 eV (415 nm) or greater to provide transparency to visible radiation and 2) by their low transport rates for $H_2O$.

In a further embodiment of the invention, the a-SiOC:H film is combined with other optically transparent films to improve the hermeticity or transmissive properties of the protective overlayers It is well known, for example, that multilayer coatings of materials with appropriate indices of refraction and film thickness can be used as antireflection coatings or optical filters. The index of refraction of a-SiOC:H depends on the composition of the film, but is typically 1.6 at a wavelength of 550 nm. This index is similar to that of cerium fluoride which can be used in a variety of antireflection coatings in the solar region of the spectrum (specific designs are discussed by H. A. MacLeod in "Thin-Film Optical Filters," McGraw-Hill, N.Y. 1989). Skilled artisans of optical coating technology will understand that there are many possible multilayer coating designs, using a-SiOC:H for one or more layers, that might be used to modify the optical switching characteristics of an electrochromic coating.

EXAMPLE 1

Figure 4:
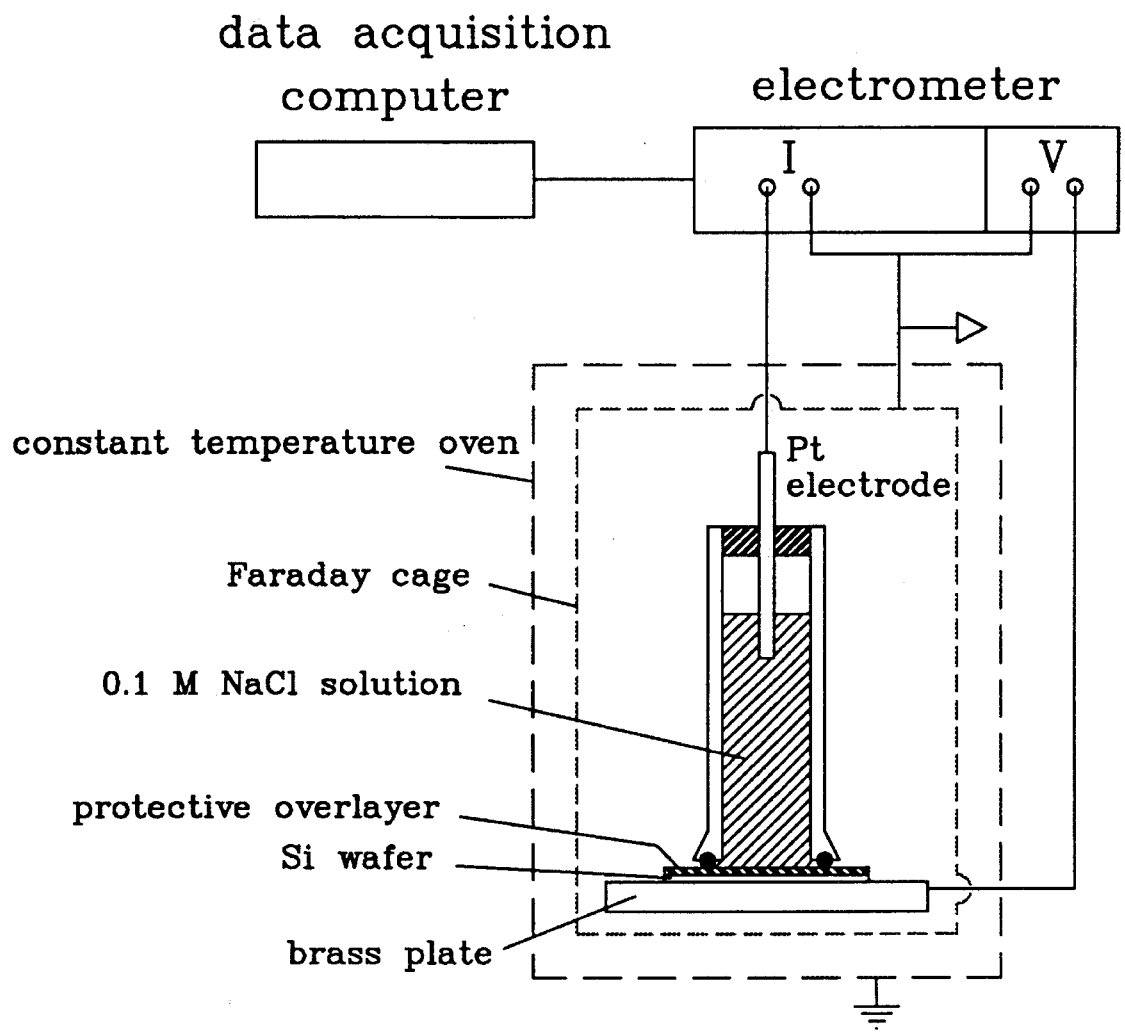
FIG. 4 is a schematic view of the apparatus used to measure leakage currents through protective overlayer materials.

To illustrate the superior properties of a-SiOC:H as a protective overlayer for electrochromic coatings, the rate of $H_2O$ and ion transport through the films was determined using leakage current measurements. In this measurement technique, the a-SiOC:H film is deposited onto a thermally oxidized Si wafer. A portion of the a-SiOC:H film is placed in contact with an aqueous electrolyte of composition 0.1M NaCl. A platinum electrode is placed in the electrolyte and an external power supply is used to apply a voltage between the Pt electrode and Si substrate. The current flowing between the Pt electrode and the coated Si wafer is measured as a function of the applied voltage. The resulting steady-state DC current at each voltage level is related to the rate at which $H_2O$ is transported through the a-SiOC:H to the $Si/SiO_2$ interface. At this interface the $H_2O$ is either reduced or oxidized, depending on the magnitude and polarity of the applied voltage bias, giving rise to the faradaic current measured in the external circuit. FIG. 4 shows the experimental apparatus used to make the leakage current measurements. When protective overlayer materials with good $H_2O$ barrier properties are evaluated, the magnitude of the currents is extremely small, often less than $10^{-13}$ A, and care in the design of the measurement apparatus and choice of equipment must be taken.

Figure 5:
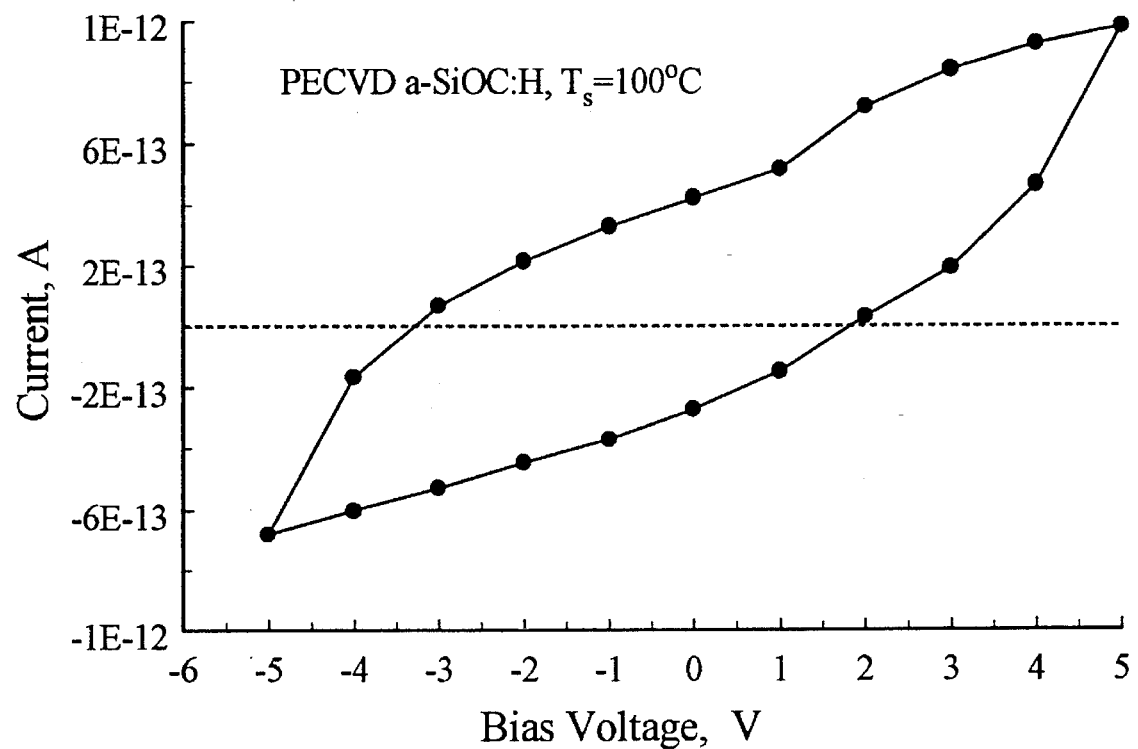
FIG. 5 shows leakage currents measured through an a-SiOC:H film deposited at a substrate temperature of 100° C.
Figure 6:
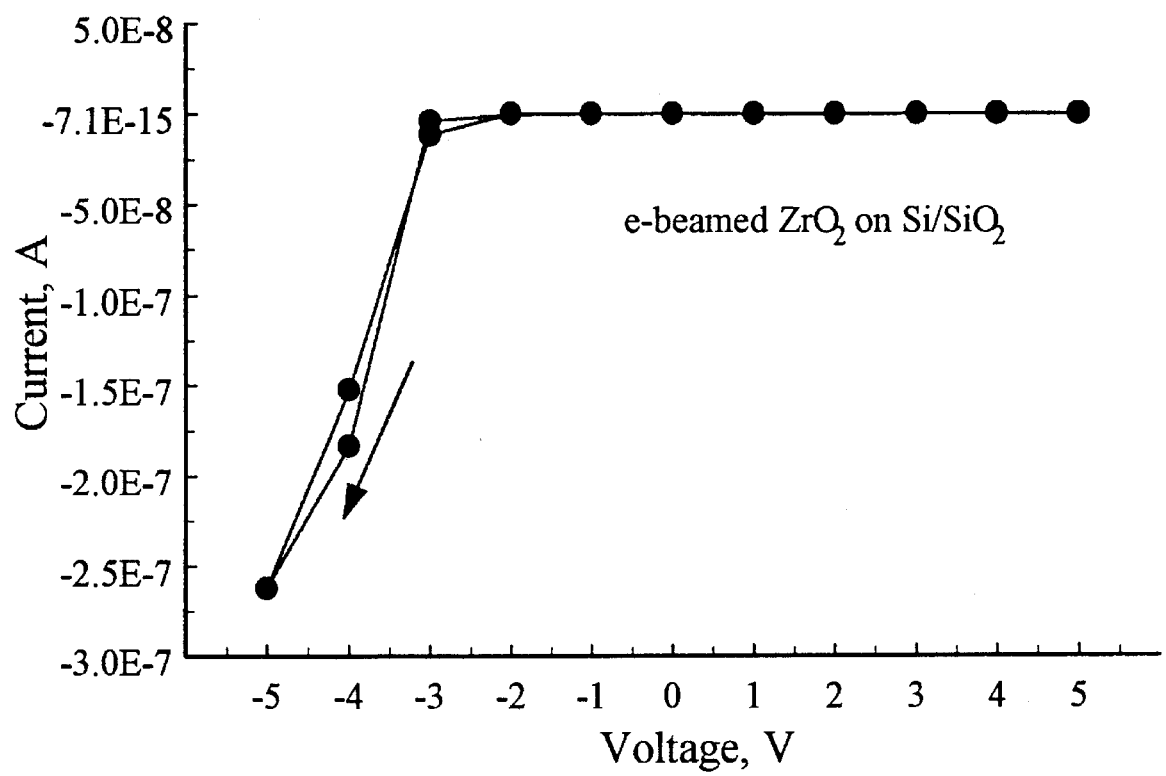
FIG. 6 shows leakage currents measured through a $ZrO_2$ film deposited at a substrate temperature of 100° C.
Figure 7:
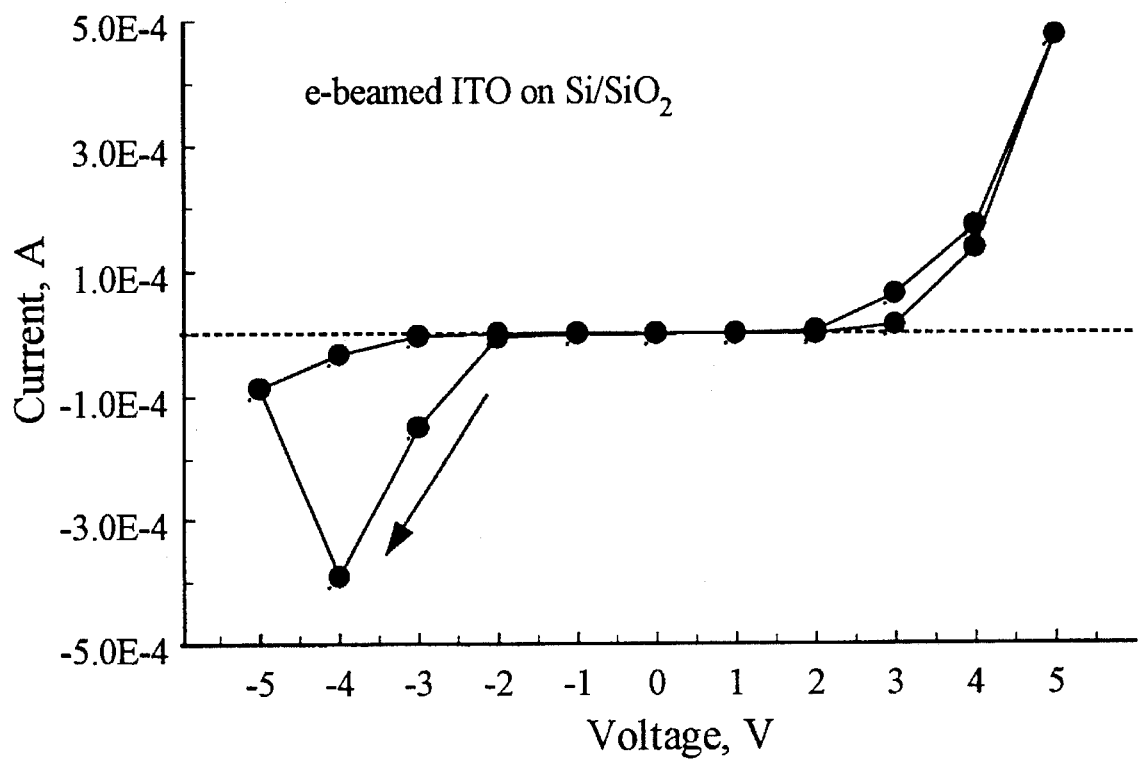
FIG. 7 shows leakage currents measured through an ITO (tin-doped indium oxide) transparent conductor film deposited at a substrate temperature of 175° C.
Figure 8:
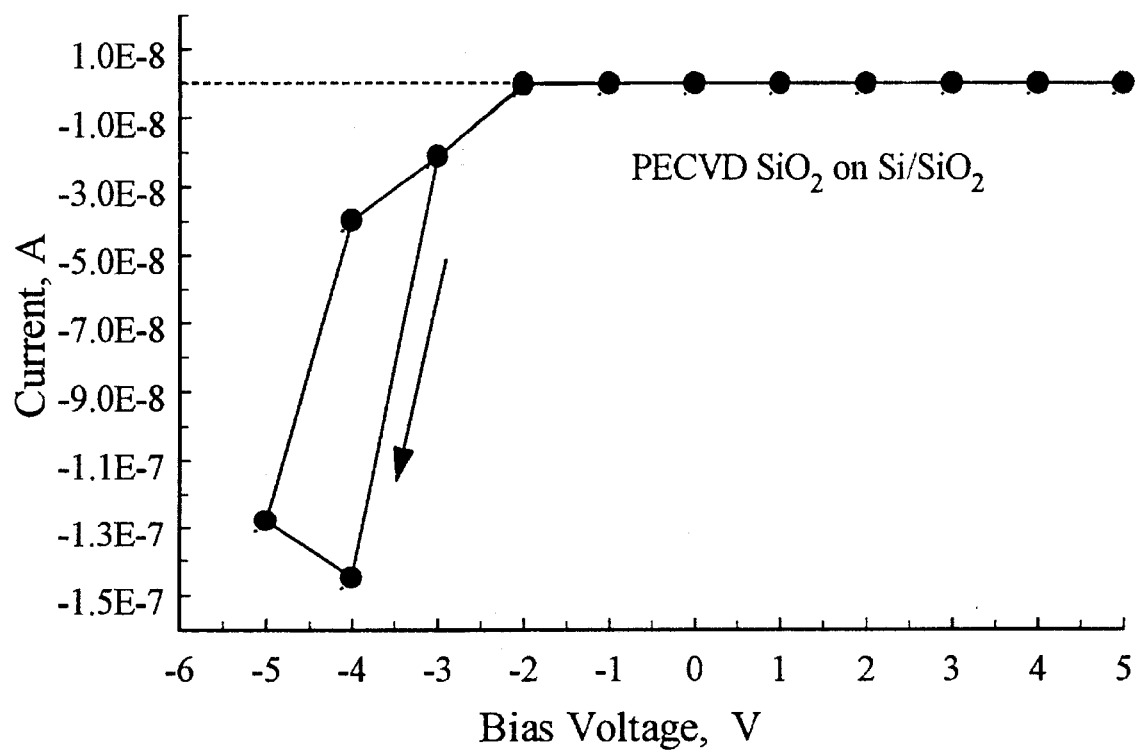
FIG. 8 shows leakage currents measured through a prior art film of amorphous PECVD $SiO_2$ deposited at a substrate temperature of 100° C.

An example of the leakage currents measured through an a-SiOC:H film of the present invention, subjected to a voltage vias of ±5 V, is shown in FIG. 5. At a bias of −5 V volts the maximum current observed was $7 \times 10^{-13}$ A. For comparison, the leakage current response of $ZrO_2$, a protective overlayer material used in prior art optical coatings, is shown in FIG. 6. At −5 V, the leakage through the $ZrO_2$ is $>2.5 \times 10^{-7}$ A, more than 5 orders of magnitude greater than that observed with a-SiOC:H. To illustrate the importance of protective overlayers for electrochromic coatings, the leakage currents measured through a film of tin-doped indium oxide (ITO) used as a transparent electrode are shown in FIG. 7. The ITO was deposited at a substrate temperature of 175° C. and is typical of the outer transparent conductor layers (layer 15 in FIG. 1) in electrochromic coatings. The leakage currents through the ITO film are $>10^{-4}$ A at both the −5 V and 5 V bias levels. The leakage currents measured through PECVD amorphous $SiO_2$ are shown in FIG. 8. At −5 V the current through the PECVD $SiO_2$ film is $1.5 \times 10^{-7}$ A, approximately 5 orders of magnitude larger than observed with a-SiOC: H.

An estimate of the transport rate of $H_2O$ through the protective overlayers can be obtained from the leakage current measurements. For the purpose of illustration, we assume that the leakage currents at the −5 V bias are due to reduction of $H_2O$ in accordance with the reaction $$H_2O + e^- \Rightarrow OH^- + \tfrac{1}{2}H_2$$

Since the reaction requires one $H_2O$ molecule per electron, the leakage current per unit area can be used to calculate a $H_2O$ transport rate using

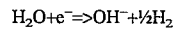

$$R = \frac{j}{F} \cdot N_0$$

where R is the rate of $H_2O$ transport (molecules/sec-cm$^2$), j the leakage current density (A/cm$^2$), F Faraday's constant (96,300 Coulombs/equivalent) and $N_o$ is Avogadro's number ($6.02 \times 10^{23}$ molecules/equivalent). From the a-SiOC:H leakage current data shown in FIG. 5, the current at −5 V is $-7 \times 10^{-13}$ A. Since the area of the film exposed to the electrolyte is 0.6 cm$^2$, the rate of $H_2O$ transport through the a-SiOC:H is $7 \times 10^6$ molecules/sec-cm$^2$. For the prior art $ZrO_2$ protective overlayer, the leakage currents shown in FIG. 6 indicate a $H_2O$ transport rate of $2.6 \times 10^{12}$ molecules/sec-cm$^2$. The PECVD $SiO_2$ films have a transport rate of $1.6 \times 10^{12}$ molecules/sec-cm$^2$. From the comparison of $H_2O$ transport rates, it is apparent that the a-SiOC:H has exceptionally low transport rates compared with prior art materials that might be used for the protection of electro-optical coatings.

EXAMPLE 2

The electronic resistivity of a-SiOC:H and a-SiC:H were determined from the slope of the current-voltage response of films deposited on ITO-coated glass. Electrical contact pads of Au were deposited on the a-SiC:H and a-SiOC:H films and the current flow through the films measured in response to a voltage applied between the ITO and the Au pads. The resistivity of the a-SiC:H was $3 \times 10^{13} \Omega$-cm. The a-SiOC:H was too resistive for an accurate measurement and a lower bound of $10^{16}$ Ω-cm was estimated from the current-voltage data. The electronic conductivity of the a-SiOC:H is comparable with $SiO_2$ or $Si_3N_4$ dielectric coatings used in conventional IC passivation while the a-SiC:H is more conductive.

EXAMPLE 3

Film stress in PECVD a-SiOC:H was calculated from changes in the curvature of a Si wafer before and after coating with a 400 nm thick a-SiOC:H film. The wafer curvature was measured using the laser interferometry method which is well known in the semiconductor industry. The stress in the a-SiOC:H was compressive and ranged from 96–107 MPa. The stress in an a-SiC:H film deposited under similar conditions was also compressive but much higher, 417–504 MPa. The low film stress in the a-SiOC:H minimizes delamination failure in protective overlayers and allows the overlayers to be used with electrochromic coatings on flexible polymer as well as glass substrates.

EXAMPLE 4

Figure 9:
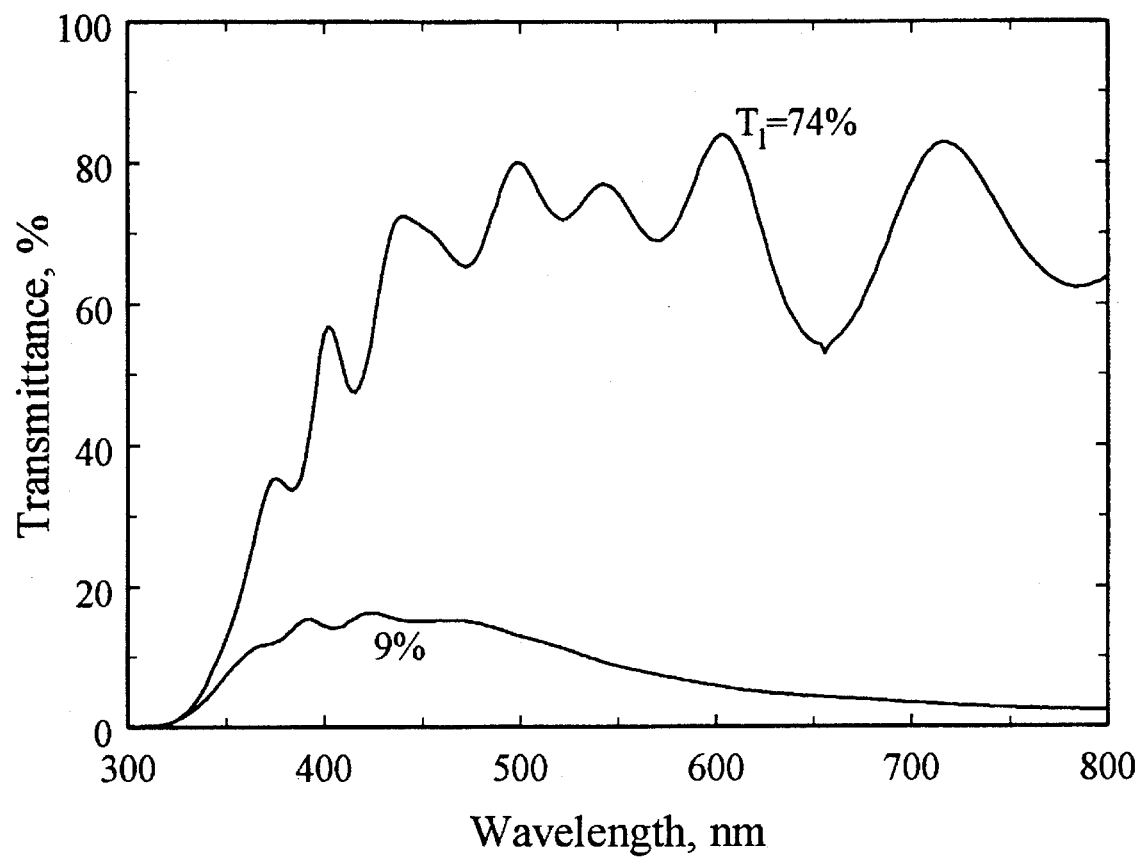
FIG. 9 shows the spectral transmittance range of a prior art electrochromic coating.
Figure 10:
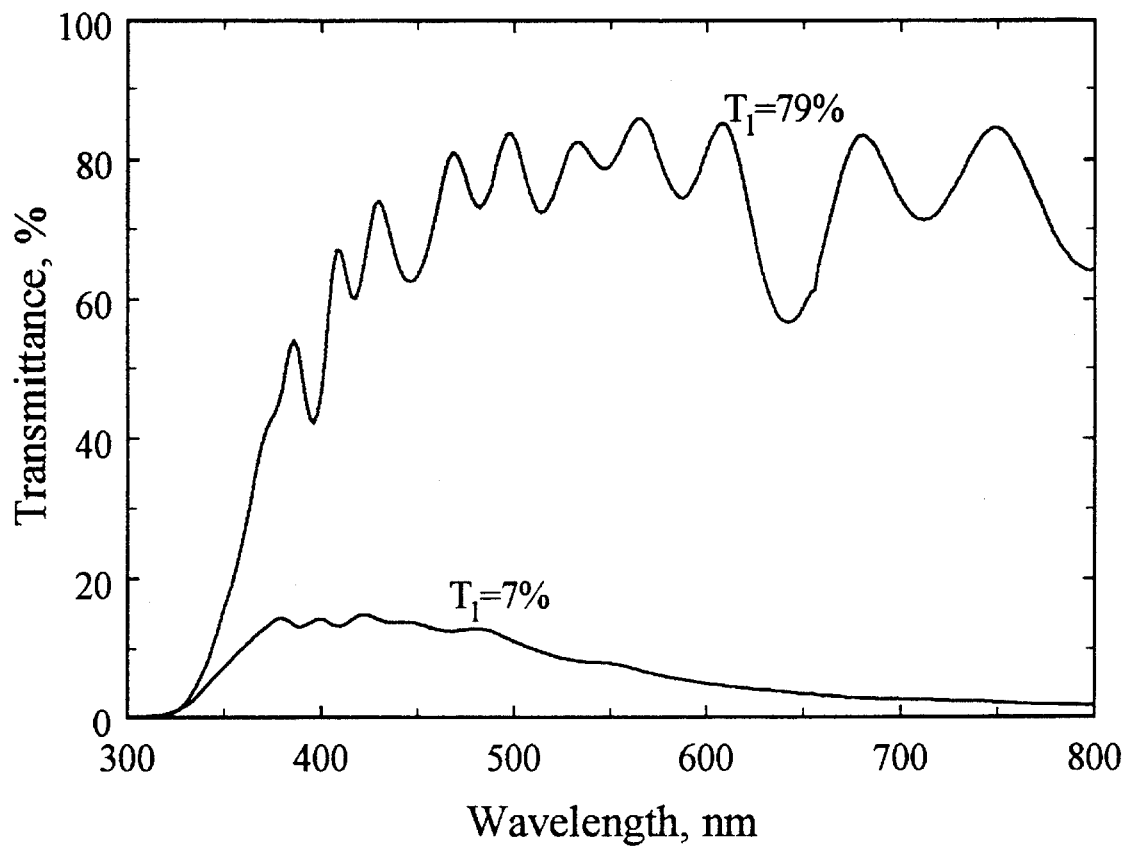
FIG. 10 shows the spectral transmittance range of an electrochromic coating of the present invention having the structure shown in FIG. 1 wherein the protective overlayer is a-SiOC:H.

A thin-film electrochromic coating was formed on a glass substrate by sequential vacuum deposition of the following layers: a transparent conductor of ITO, a counter electrode of $Li_yCrO_{2+x}$; a $Li^+$ ion conductor of $Li_2O$-$B_2O_3$; an electrochromic film of amorphous $WO_3$; and, a second transparent conductor of ITO. Details of the deposition processes are taught in Cogan and Rauh, U.S. Pat. No. 5,080,471. The minimum and maximum transmittance spectra of the coating are shown in FIG. 9 at an applied voltage of ±3 V. The coating has a luminous (photopic) transmittance range of 9% to 74% at these switching voltage levels. The electrochromic coating was then placed in a commercial PECVD system and a protective overlayer of a-SiOC:H deposited on the coating using the process conditions provided in Table 1. The thickness of the as-deposited a-SiOC:H was approximately 500 nm. The minimum and maximum transmittance spectra of the coating at ±3 V after a-SiOC:H deposition are shown in FIG. 10. The luminous transmittance range of the coating with the a-SiOC:H is 7% to 79%.

EXAMPLE 5

Figure 11:
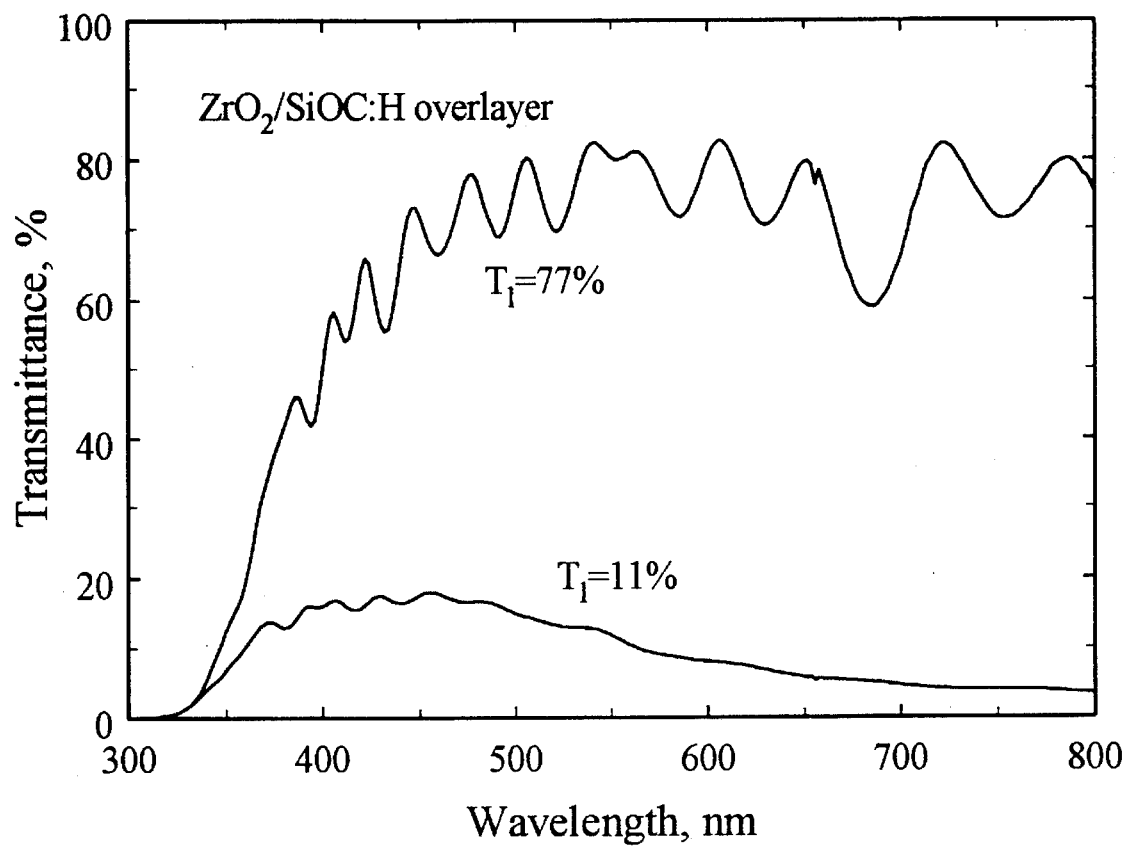
FIG. 11 shows the spectral transmittance range of an electrochromic coating of the present invention having a protective overlayer comprising a film of $ZrO_2$ and a film of a-SiOC:H.

A thin-film electrochromic coating was formed on a glass substrate in the manner described in Example 3. A protective overlayer comprising a 190 nm thick film of e-beam evaporated $ZrO_2$, deposited at a substrate temperature of 100° C., and a 500 nm thick film of a-SiOC:H deposited in accordance with the conditions described in Table 1 was then deposited over the coating. FIG. 11 shows the spectral transmittance range of the coating. The photopic transmittance ($T_1$) varied from 11% to 77%.

TABLE 1

| Process Variable | Value |
|---|---|
| base pressure in chamber | <20 millitorr |
| process pressure | 500 millitorr |
| process gases and flow rates: | |
| Silane (2% in $N_2$) | 400 sccm |

TABLE 1-continued

| Process Variable | Value |
|---|---|
| Methane | 400 sccm |
| Nitrous oxide (100%) | 16 sccm |
| substrate temperature | 100° C. |
| RF power 13.56 MHz | 120 watts (20 cm diameter electrode) |
| electrode-to-substrate distance | approximately 2 cm |

TABLE 2

| $N_2O$/$CH_4$ ratio | thickness (nm) | $E_o$(eV) | $\lambda_o$(nm) | T photopic (%) |
|---|---|---|---|---|
| 0 | 316 | 2.12 | 585 | 60 |
| 1/8 | 510 | 3.00 | 414 | 89 |
| 1/4 | 537 | 3.02 | 411 | 90 |
| 5/12 | 1,470 | 3.27 | 380 | 88 |
| 2/3 | 472 | 3.78 | 328 | 88 |

What is claimed is:

1. An electro-optical device comprising;

a substrate;

an electrochromic coating comprising at least one thin electrochromic film, said thin electrochromic film having an electrically controllable optical state, disposed on said substrate, and a protective overlayer disposed on said electrochromic coating, said protective overlayer comprising at least one thin-film of a-SiOC:H having an oxygen to carbon ratio such that the optical absorption edge of said amorphous a-SiOC:H is at least 3 eV and the water transport is less than $10^{12}$ molecules/sec-$cm^2$ through a 500 nm thick film of said a-SiOC:H.

2. The electro-optical device of claim 1, wherein said a-SiOC:H thin-film contains nitrogen as an impurity, the concentration of said nitrogen impurity being less than an amount necessary to shift the optical absorption edge of said a-SiOC:H to less than 3 eV.

3. The electro-optical device of claim 1, wherein said protective overlayer acts as multilayer interference filter, the indices of refraction and thickness of the a-SiOC:H and other thin-films in said protective overlayer being chosen to increase the maximum transmittance of said electro-optic device in one or more wavelength ranges in the solar spectrum.

4. The electro-optical device of claim 1, wherein said electrochromic coating comprises at least two reduction-oxidation active layers chosen singly or as a mixture from the group of electrochromic materials consisting of $WO_3$, $MoO_3$, $Li_yCrO_{2+x}$, $V_2O_5$, $Nb_2O_5$, $TiO_2$, and mixed-oxides of Cr and V and wherein a quantity of electro-active lithium is distributed between said reduction-oxidation active layers.

5. The electro-optical device of claim 1, wherein said electrochromic coating comprises at least two reduction-oxidation active layers chosen singly or as a mixture from the group $WO_3$, $MoO_3$, $IrO_2$, and NiO, wherein one or more of said reduction-oxidation active layers is partially reduced.

6. The electro-optical device of claim 1, wherein said electrochromic coating comprises;

a first electronic contact disposed over said substrate, a layer comprised of a first electrochromic material that colors on oxidation;

a layer comprised of a second electrochromic material that colors on reduction;

an ion conducting layer disposed between said first and second electrochromic layers;

said first and second electrochromic material being disposed over said first electronic contact; and a second electronic contact disposed over said previous layers.

7. The electro-optical device of claim 1, wherein said protective overlayer comprises one or more layers of said a-SiOC:H and one or more layers of zirconium dioxide.

8. A method for making an electro-optical device comprising a substrate; at least one electrochromic coating comprising at least one thin electrochromic film, wherein each of said films has an electrically controllable optical state, and a protective overlayer disposed on said electrochromic coating comprising the steps of:

providing a substrate with at least one electrochromic layer disposed on said substrate to a vacuum of less than about 20 millitorr;

maintaining a temperature of said substrate of at least about 100 degrees Celsius;

providing a reactive gas mixture comprising at least silane, methane, and nitrous oxide at a pressure of about 200 millitorr to 1 torr;

providing an RF field at about 50 kHz to 13.56 MHz at a power density of about 0.1 to 1 watt/cm$^2$ of substrate area for a time sufficient to provide an a-SiOC:H coating having an oxygen to carbon ratio such that the optical absorption edge of said a-SiOC:H is at least 3 eV and the water transport is less than $10^{12}$ molecules/sec-cm$^2$ through a 500 nm thick film of said a-SiOC:H.

* * * * *